United States Patent [19]
Seki et al.

[11] Patent Number: 5,293,232
[45] Date of Patent: Mar. 8, 1994

[54] APPARATUS FOR TRANSMITTING STILL IMAGES RETRIEVED FROM A STILL IMAGE FILING APPARATUS

[75] Inventors: Yousuke Seki; Akihiko Matsumoto, both of Kanagawa, Japan

[73] Assignee: Sony Corporation, Tokyo, Japan

[21] Appl. No.: 858,591

[22] Filed: Mar. 27, 1992

[30] Foreign Application Priority Data

Apr. 2, 1991 [JP] Japan .................. 3-069966
Apr. 4, 1991 [JP] Japan .................. 3-071845

[51] Int. Cl.⁵ .......................................... H04N 5/907
[52] U.S. Cl. .............................. 358/715; 358/909.1; 360/35.1; 395/165
[58] Field of Search .............. 358/139, 185, 160, 22, 358/909; 360/35.1; 395/152, 164, 165, 166; 340/799; H04N 5/907

[56] References Cited

U.S. PATENT DOCUMENTS

| | | | |
|---|---|---|---|
| 4,104,624 | 8/1978 | Hamada | 340/799 |
| 4,660,101 | 4/1987 | Martin | 360/35.1 |
| 4,890,100 | 12/1989 | Kurakake et al. | 340/799 |
| 4,918,526 | 4/1990 | Lewis et al. | 358/160 |
| 5,029,112 | 7/1991 | Sakamoto et al. | 364/521 |
| 5,055,928 | 10/1991 | Klingelhofer | 358/139 |
| 5,117,238 | 5/1992 | Kroos et al. | 358/22 |
| 5,134,472 | 7/1992 | Abe | 358/22 |
| 5,165,016 | 11/1992 | Takahashi | 395/165 |

FOREIGN PATENT DOCUMENTS

0258976  3/1988 European Pat. Off.
2095949  10/1982 United Kingdom.

OTHER PUBLICATIONS

Patent Abstracts of Japan, vol. 13, No. 436 (P-938) Sep. 29, 1989 and JP-A-11 66 127 (Hitachi Ltd.) Jun. 30, 1989.

Primary Examiner—James J. Groody
Assistant Examiner—Jeffrey Muerell
Attorney, Agent, or Firm—William S. Frommer; Alvin Sinderbrand

[57] ABSTRACT

A still image signal output apparatus connected to at least one still image filing apparatus is comprised of a first memory for storing a data signal representative of a transmission sequence of the still image signal, a second memory having at least a pair of frame memories each for storing one frame of the still image signal in accordance with the data signal, a third memory for storing a plurality of frames of the still image signal in accordance with the data signal, a processor circuit for controlling a supply of the still image signal stored in the third memory to the second memory and the still image signal stored in the still image filing apparatus to the third memory in accordance with the data signal when a still image signal stored in the second memory is output therefrom.

8 Claims, 5 Drawing Sheets

| Semi-conductor Memory No. | Disc No. | Still Image No. |
|---|---|---|
| 1 | OOOO | OOOOOO |
| 2 | OOOO | OOOOOO |
| 3 | OOOO | OOOOOO |
| ⋮ | ⋮ | ⋮ |

APPARATUS FOR TRANSMITTING STILL IMAGES RETRIEVED FROM A STILL IMAGE FILLING APPARATUS

BACKGROUND OF THE INVENTION

1. Field of the Invention

The present invention relates generally to still image signal output apparatus and, more particularly to a still image signal output apparatus utilized in broadcast stations or the like.

2. Description of the Related Art

The assignee of the present application has previously proposed a still image filing apparatus suitable for producing television programs in the broadcast stations, for example (see Japanese Laid-Open Patent Publication No. 2-285863 or the like). However, according to this previously-proposed still image filing apparatus, when a magnetooptical disk, for example, is utilized as a record medium, the access to the still image stored takes a lot of time while the magnetooptical disk has a considerably large storage capacity and can store a large number of still images. For example, when a video signal is recorded in the form of a component digital signal, for example, the access for one still image needs several seconds (e.g., about 2.0 seconds). As a result, the transmission of the still image is limited by this access time and cannot be carried out in an interval shorter than this access time. If one still image filing apparatus is simultaneously accessed by a plurality of users, then the access time is extended more.

OBJECTS AND SUMMARY OF THE INVENTION

Therefore, it is an object of the present invention to provide an improved still image signal output apparatus in which the aforesaid shortcomings and disadvantages encountered with the prior art can be eliminated.

More specifically, it is an object of the present invention to provide a still image signal output apparatus in which a still image can be transmitted to a still image filing apparatus in a shorter interval.

It is another object of the present invention to provide a still image signal output apparatus in which an advantage of this still image signal output apparatus can be increased particularly when a plurality of users utilize the operation key apparatus simultaneously.

It is a further object of the present invention to provide a still image signal output apparatus in which an adaptability of the still image signal output apparatus to the production of television program or the like can be increased.

As a first aspect of the present invention, a still image signal output apparatus connected to at least one still image filing apparatus is comprised of a first memory for storing a data signal representative of a transmission sequence of the still image signal, a second memory having at least a pair of frame memories each for storing one frame of the still image signal in accordance with the data signal, a third memory for storing a plurality of frames of the still image signal in accordance with the data signal, a processor circuit for controlling a supply of the still image signal stored in the third memory to the second memory and the still image signal stored in the still image filing apparatus to the third memory in accordance with the data signal when a still image signal stored in the second memory is output therefrom.

BRIEF DESCRIPTION OF THE DRAWINGS

A better understanding of other objects, features, and advantages of the invention can be gained from a consideration of the following detailed description of an illustrative embodiment thereof, in conjunction with the figures of the accompanying drawings, in which.

DESCRIPTION OF THE PREFERRED EMBODIMENT

Figure 1:
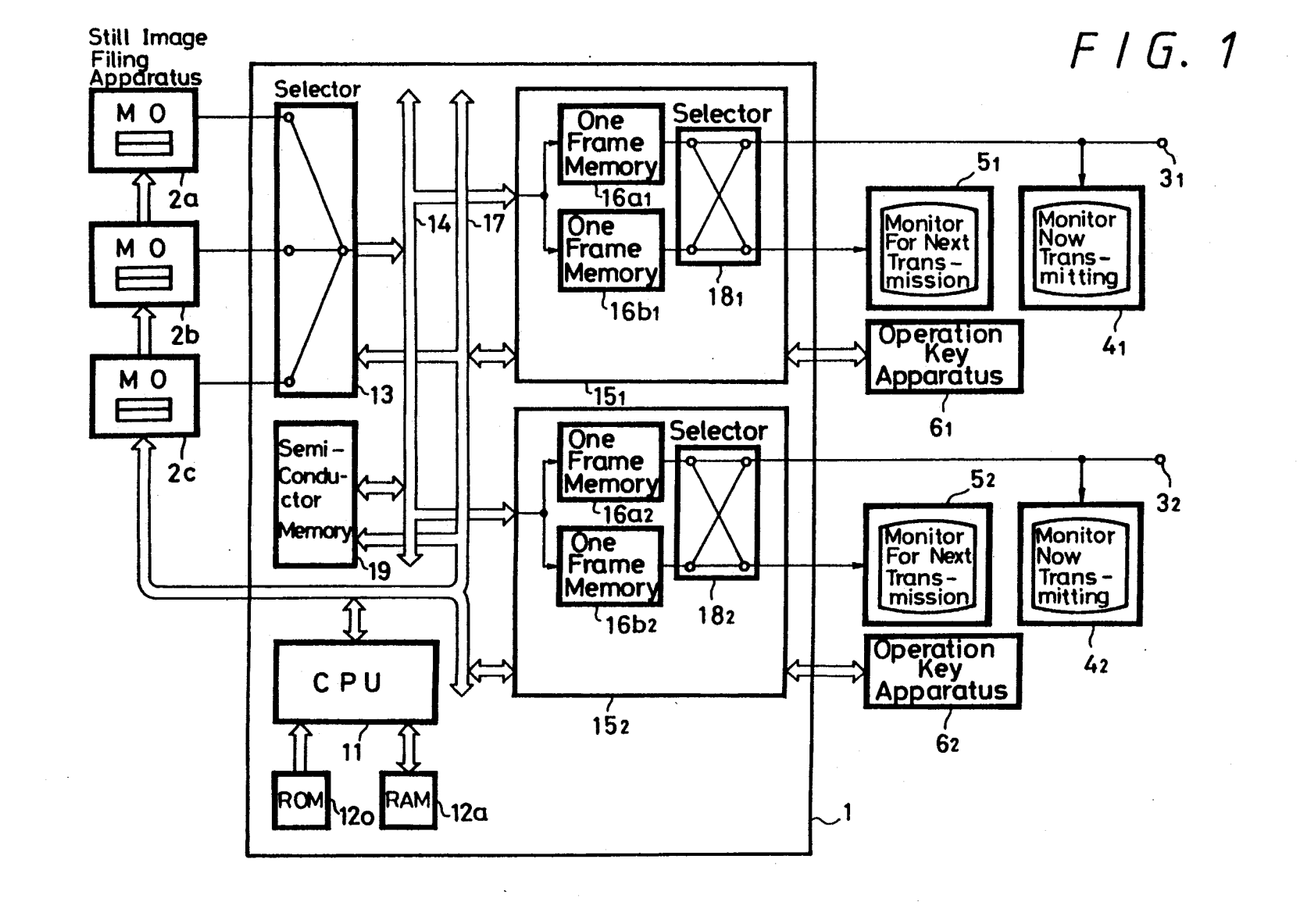
FIG. 1 is a block diagram showing a still image signal output apparatus according to an embodiment of the present invention.

FIG. 1 of the accompanying drawings shows in block form the entire arrangement of a still image signal output apparatus according to an embodiment of the present invention.

As shown in FIG. 1, there is provided a still image signal output apparatus 1, the operation of which is controlled by a central processing unit (CPU) 11. The CPU 11 is provided with a memory 12a in which there are stored data such as a play list indicative of a transmission sequence of still images according to the scenario or the like and a memory 12o in which there are stored data such as a protocol of operation of the apparatus or the like. The memory 12a might be formed of a random access memory (RAM) and the memory 12o might be formed of a read-only memory (ROM).

Still image filing apparatus 2a, 2b and 2c are respectively provided with magnetooptical discs (represented by MO in FIG. 1 for simplicity). A remote control signal generated from the CPU 11 in the still image signal output apparatus 1 is supplied to these still image filing apparatus 2a, 2b and 2c, from which still images are sequentially taken out in accordance with the play list stored in the RAM 12a or the like. The still images thus taken out are supplied to the still image signal output apparatus 1.

Further, in the still image signal output apparatus 1, still images supplied from the still image filing apparatus 2a, 2b and 2c are selected by a selector 13 and the still image thus selected is supplied through a data bus 14 to one frame memories $16a_1$, $16b_1$ and $16a_2$, $16b_2$ of output substrates $15_1$, $15_2$ and written therein. In that case, the selection of the still images by the selector 13 and the writing of still image in the one frame memories $16a_1$, $16b_1$ and $16a_2$, $16b_2$ are controlled by signals supplied thereto from the CPU 11 through a control bus 17.

Different play lists for respective output substrates $15_1$, $15_2$ are stored in the RAM 12a. Still images $A_1$, $A_2$ and following still images $B_1$, $B_2$ are respectively written in one frame memories $16a_1$, $16a_2$ and $16b_1$, $16b_2$ in accordance with these play lists. Still images read out from these one frame memories $16a_1$, $16a_2$ and $16b_1$, $16b_2$ are respectively selected by 2-output selectors $18_1$ and $18_2$ and the still images thus selected at their one outputs are respectively supplied to still image transmission output terminals $3_1$ and $3_2$. These still images also are supplied to monitor receivers $4_1$ and $4_2$ during the transmission and still images selected to the other outputs of the selectors $18_1$ and $18_2$ are supplied to the next transmission monitor receivers $5_1$, $5_2$, respectively.

Operation key apparatus $6_1$ and $6_2$ are provided, and the selection of play lists, the transmission of still image or the like are controlled by operating these key apparatus $6_1$ and $6_2$.

More specifically, the read-out of data from the one frame memories $16a_1$ and $16b_1$ and the selection of the still images by the selector $18_1$ are controlled by the control signal from the key apparatus $6_1$. In the initial state, the first still image $A_1$ delivered first is supplied to the transmission output terminal $3_1$ and also supplied to the transmitting monitor receiver $4_1$. Then, the next still image $B_1$ is supplied to the next transmission monitor receiver $5_1$. After the transmission of the still image selected to one output terminal of the selector $18_1$ is finished, the still images read out from the selected one frame memories $16a_1$, $16b_1$ are switched. Simultaneously, an indicating signal indicative of the end of transmission is supplied through the control bus 17 to the CPU 11, and under the control of the CPU 11, the next still image $C_1$ to be delivered next to the above one output in accordance with the play list is written in one frame memories $16a_1$ and $16b_1$ at which the still image is not selected.

In a like manner, the read-out of still image from the one frame memories $16a_2$, $16b_2$ and the selection of still image by the selector $18_2$ are controlled by the control signal from the key apparatus $6_2$.

Consequently, under the control of the control signals from the key apparatus $6_1$ and $6_2$, the still images $A_1$, $B_1$, ... and $A_2$, $B_2$, ... transmitted in accordance with the play list are sequentially written in the one frame memories $16a_1$, $16b_1$, $16a_2$ and $16b_2$, sequentially developed at the transmission output terminals $3_1$, $3_2$ and supplied to the transmitting monitor receivers $4_1$, $4_2$. Also, the next still images $B_1$, $C_1$, ... and $B_2$, $C_2$, ... are supplied the next transmission monitor receivers $5_1$, $5_2$.

Further, in the still image signal output apparatus 1, the data bus 14 is coupled with a semiconductor memory 19 having a storage capacity of a plurality of frames. This semiconductor memory 19 is utilized in cooperation with the one frame memory under the control of the CPU 11.

Figure 2A:
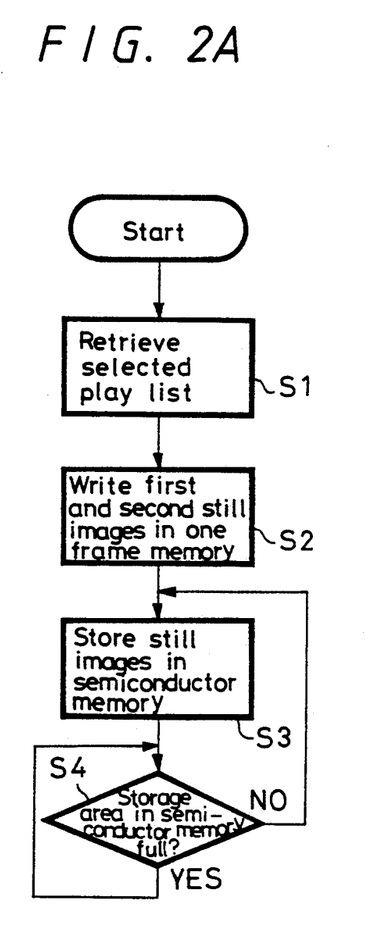
FIGS. 2A and 2B are respectively flowcharts to which references will be made in explaining operation of the still image signal output apparatus according to the present invention.
Figure 2B:
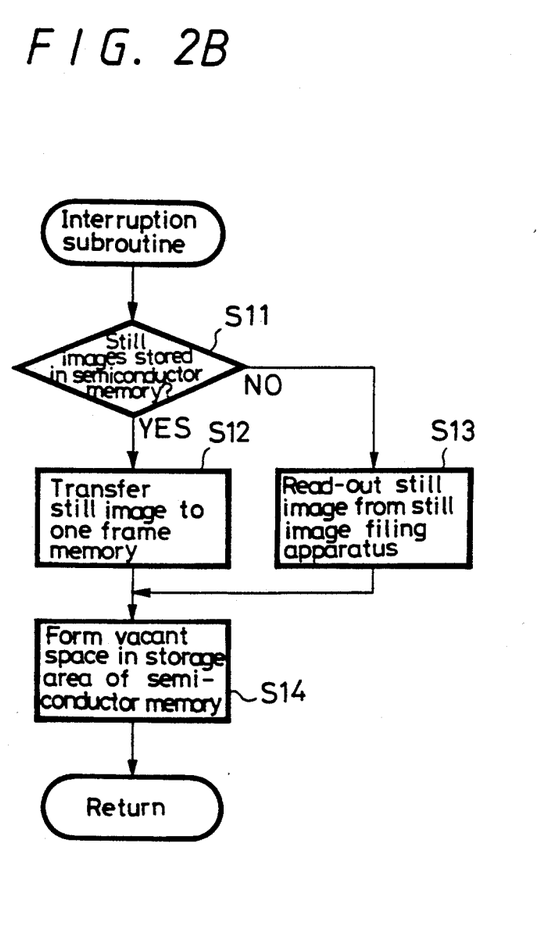

More specifically, the ROM 12o of the CPU 11 has an operation program shown in flowcharts forming FIGS. 2A and 2B, for example. FIG. 2A shows a main routine and referring to FIG. 2A, following the Start of operation, the play list selected is checked at step S1. In the next step S2, the first still image and the next still images to be transmitted in accordance with the play list are read out from the still image filing apparatus $2a$, $2b$ and $2c$ and then written in the one frame memories 16. In step S3, still images to be transmitted in accordance with the play list are read out from the still image filing apparatus $2a$, $2b$ and $2c$ and then sequentially stored in the semiconductor memory 19. Then, it is determined in decision step S4 by the CPU 11 whether or not the storage area of the semiconductor memory 19 is full. If the storage area of the semiconductor memory 19 is full as represented by a YES in decision step S4, then the decision step S4 is repeated. If a NO is output at decision step S4, then the processing returns to step S3.

FIG. 2B shows an interruption subroutine, in which an interruption occurs in the main routine when the indicating signal indicative of the end of transmission is supplied to the CPU 11. In the interruption subroutine, as shown in FIG. 2B, it is determined in decision step S11 by the CPU 11 whether or not the still image is stored in the semiconductor memory 19. If the still image is stored in the semiconductor memory 19 as represented by a YES at decision step S11, then the processing proceeds to the next step S12. In step S12, the still image stored in the semiconductor memory 19 is transferred to the one frame memories 16. If the still image is not stored in the semiconductor memory 19 as represented by a NO at decision step S11, then the processing proceeds to the next step S13, whereat the still images are read out from the still image filing apparatus $2a$, $2b$ and $2c$ and then written in the one frame memories 16. At the completion of these steps S11, S12 and S13, a vacant space is formed in the storage area of the semiconductor memory 19 in step S14 and then the processing returns to the main routine shown in FIG. 2A.

Figure 3A:
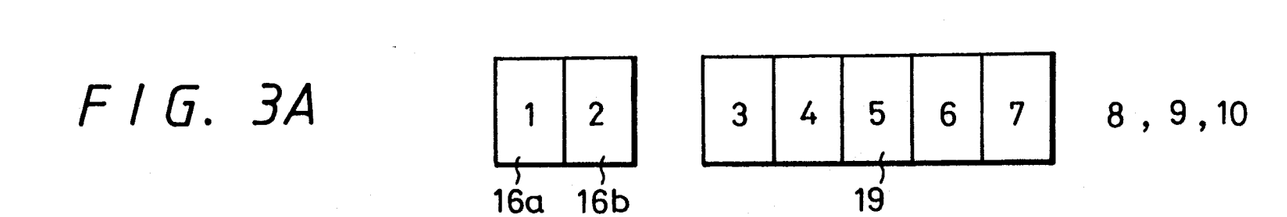
FIGS. 3A through 3C are respectively schematic diagrams used to explain the storage of one frame memory and a semiconductor memory used in the present invention.
Figure 3B:
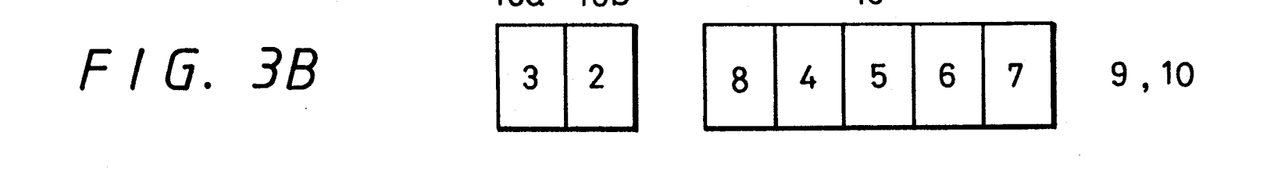
Figure 3C:
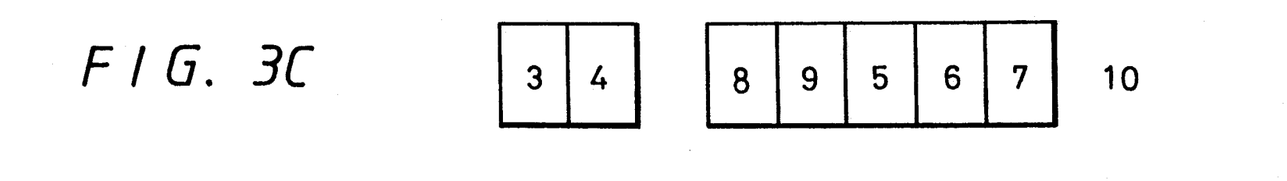

Accordingly, in this apparatus, let us consider the case such that 5 divided frames of the semiconductor memory 19 are available for one user. In this case, under the condition such that the step S3 is ended in the above-mentioned main routine, still images "1" and "2" are written in the one frame memories 16 and still images "3" to "7" are stored in the semiconductor memory 19 as shown in FIG. 3A. After the transmission of the first still image "1" is finished, the still image "3" is transferred from the semiconductor memory 19 to the one frame memory $16a$ from which the first still image "1" is already transmitted, and a succeeding still image "8" is stored in a vacant space formed in the semiconductor memory 19 as shown in FIG. 3B. Further, after the transmission of the next still image "2" is finished, the still image "4" is transferred from the semiconductor memory 19 to the one frame memory $16b$ from which the still image "2" is already transmitted, and a succeeding still image "9" is stored in a vacant space formed in the semiconductor memory 19 as shown in FIG. 3C.

The still images are sequentially transmitted in this way. In this case, the still images can be transferred from the semiconductor memory 19 to the one frame memories 16 during one frame period in a direct memory access (DMA) fashion and therefore the transmission of the still images can be carried out in a very short interval. When the semiconductor memory 19 has no data stored therein, the still images can be transmitted from the still image filing apparatus $2a$, $2b$ and $2c$ similarly to the prior art. Alternatively, when the semiconductor memory 19 has no data stored therein, an alarm message or the like might be displayed on the operation key apparatus 6.

Furthermore, in this still image signal output apparatus 1, when a plurality of output substrates $15_1$ and $15_a$ are provided and a plurality of operation key apparatus $6_1$ and $6_2$ are utilized, the semiconductor memory 19 can be utilized in the form of divided semiconductor memories at the unit of frames for every operation key apparatus $6_1$ and $6_2$.

Figure 4A:
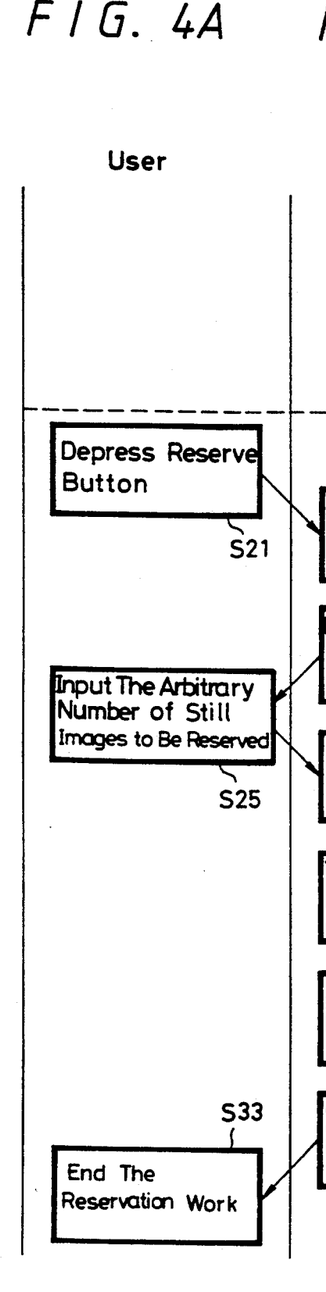
FIGS. 4A through 4C are respectively schematic diagrams used to explain a procedure for dividing the semiconductor memory.
Figure 4B:
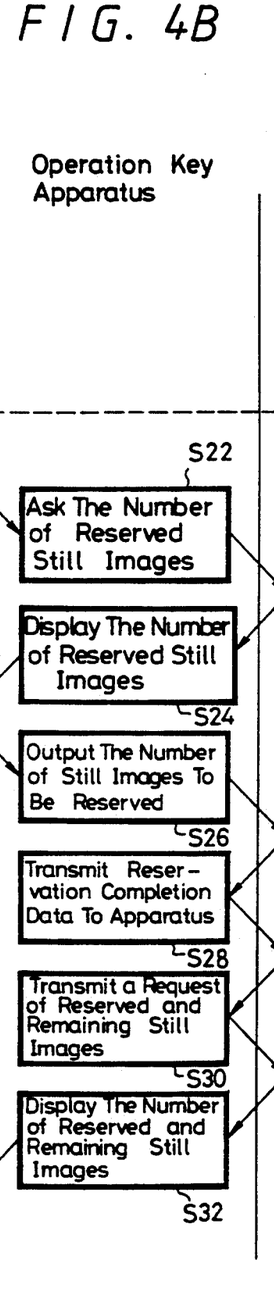
Figure 4C:
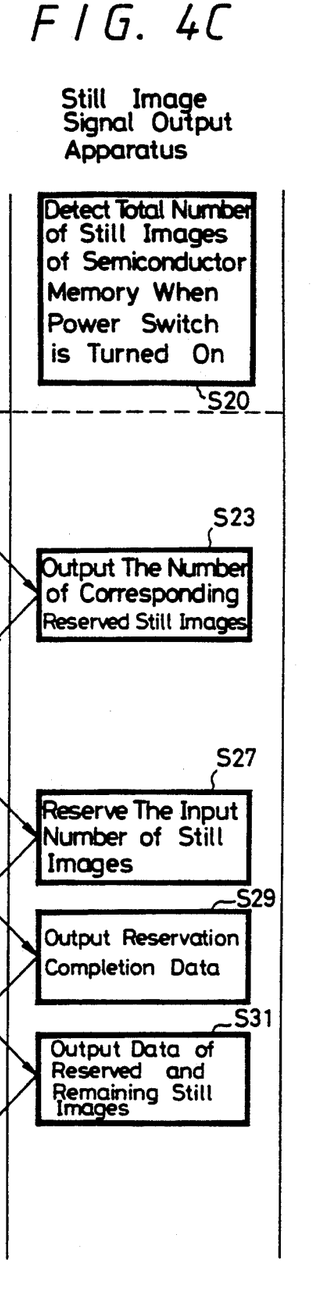

FIGS. 4A through 4C are diagrams used to explain the procedure of dividing the semiconductor memory 19, in which FIG. 4A shows manipulation of the user, FIG. 4B shows operation of the operation key apparatus 6 and FIG. 4C shows operation of the still image signal output apparatus.

As illustrated, when the power switch is turned on, the storage capacity (total number of still images that can be stored at the unit of frames) of the semiconductor memory 19 is detected by the still image signal output apparatus 1 in step S20. When the user depresses a reserve button (not shown) of the operation key apparatus 6 at step S21, then the operation key apparatus 6 asks the still image signal output apparatus 1 the number of reserved still images at present in step S22. On the other hand, the number of reserved still images for each operation key apparatus 6 is stored in the still image signal output apparatus 1, and the number of the reserved still images is output to the operation key apparatus 6 in step S23. Thus, in step S24, the number of reserved still images is displayed on the display unit of the operation key apparatus 6 and a message of "how many still images reserved?" also is displayed on the display unit. In this case, if the user inputs zero still image, then all reservations are released.

Further, if the user inputs the arbitrary number of still images to be reserved, then data indicative of the number of still images input from the operation key apparatus 6 is output to the still image signal output apparatus 1 in step S26. Thus, in the next step S27, the input number of still images is reserved from the total number of still images in the still image signal output apparatus 1. Furthermore, the operation key apparatus 6 transmits data indicative of the reservation completion to the still image signal output terminal 1 in step S28, and then the still image signal output apparatus 1 outputs a signal indicative of the end of reservation in step S29. In the next step S30, the operation key apparatus 6 transmits the reserved number of still images and the number of remaining still images to the still image signal output apparatus 1. Then, the still image signal output apparatus 1 outputs these numbers to the operation key apparatus 6 in step S31, and the operation key apparatus 6 displays the number of reserved still images and the number of remaining still images on the display unit thereof at step s32. Therefore, the reservation work in the semiconductor memory 19 is ended with step S33.

In the above-mentioned apparatus, the semiconductor memory 19 is composed of a plurality of printed circuit boards and the storage capacity (total number of still images that can be stored at the unit of frames) is detected by detecting the number of circuit boards installed. That is, N assumes the storage capacity of one printed circuit board at the unit of frames and M assumes the number of circuit boards installed. Then, the total number of frames will be expressed as NM. Whereas, when the arbitrary operation key apparatus 6 reserves P number of still images, then the number of remaining still images which can be reserved by other operation key apparatus 6 is expressed as:

$$NM - P \text{ still images } (P \leq NM)$$

Further, other operation key apparatus 6 can learn the number (NM−P number) of remaining still images that can be reserved and other operation key apparatus 6 can reserve the still images in a range of NM−P still images. Also, each of the operation key apparatus 6 has a function to cancel the reservation so that a plurality of operation key apparatus 6 can allocate the NM still images thereamong easily and freely.

A remaining storage portion (NM−ΣP still images) of the semiconductor memory 19 by dividing (reserving) the abovementioned semiconductor memory 19 will be described. In this case, the still images read-out from the still image filing apparatus 2a, 2b and 2c are stored in the one frame memories 16 ($16a_1$, $16b_1$) and ($16a_2$, $16b_2$) and in the semiconductor memory 19 at the divided (reserved) portion thereof. Simultaneously, these still images are sequentially stored in the remaining portion (NM −ΣP still images) of the semiconductor memory 19. If the storage area of the remaining portion is fully occupied, then the still images stored in the remaining portion are rewritten in the sequential order of the still image stored first.

That is, when the total number of the semiconductor memories 19 is 20, for example, and 5 semiconductor memories 19 are reserved by each of the operation key apparatus $6_1$ and $6_2$, then 10 semiconductor memories 19 are left as the remaining storage areas in which 10 still images read out from the still image filing apparatus 2a, 2b and 2c are stored.

Thus, when the same still image is sequentially requested by the two operation key apparatus $6_1$ and $6_2$, for example, the still images read out from the still image filing apparatus 2a, 2b and 2c are stored in the one frame memory 16 of one operation key apparatus 6 or in the reserved portion of the semiconductor memory 19 and simultaneously stored in the remaining storage portion of the semiconductor memory 19. Then, the still images stored in the remaining portion of the semiconductor memory 19 are read out and then stored in the one frame memory 16 of the other operation key apparatus 6 or in the reserved portion of the semiconductor memory 19. As a result, the number of the access to the still image filing apparatus 2a, 2b and 2c can be reduced and the operation speed of the entirety of the apparatus can be increased.

Figure 5:
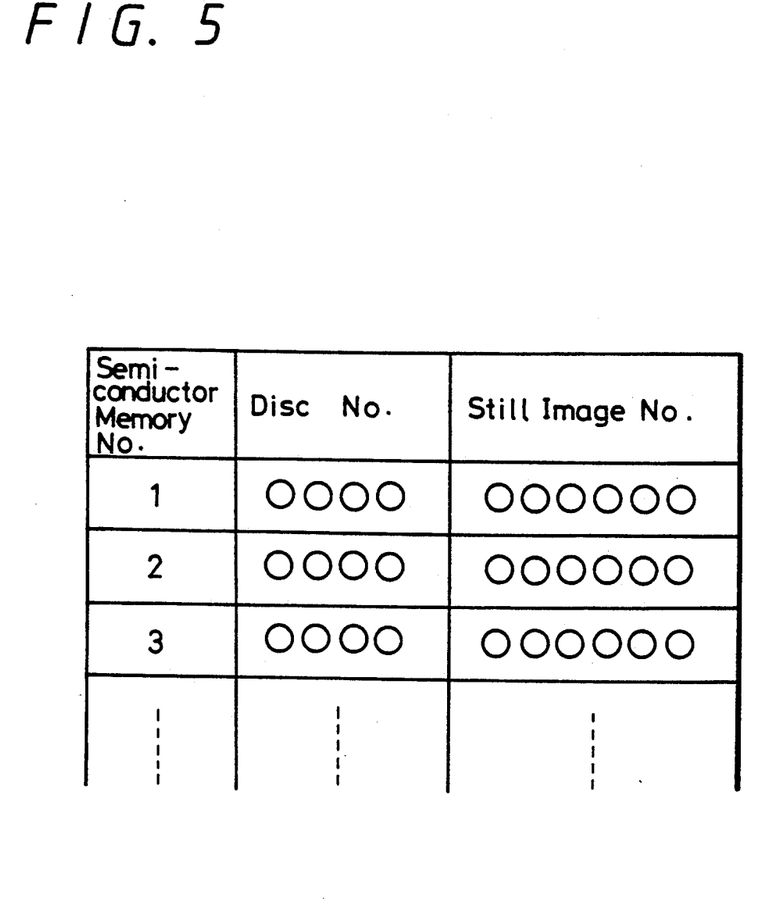
FIG. 5 is a table useful for explaining a retrieval of stored contents in the semiconductor memory.

Further, for the still images stored in these semiconductor memories 19, a list in which stored contents shown, for example, in FIG. 5 are written is provided in the RAM 12a. More specifically, the disk numbers of the magnetooptical (MO) disks in which the original still images are recorded and the still image numbers stored in response to the frame numbers of the semiconductor memory 19 are written on this list.

When new still images are read out from the still image filing apparatus 2a, 2b and 2c in accordance with the play list by the instructions from the operation key apparatus $6_1$ and $6_2$, for example, the list in which the stored contents thereof are written is retrieved. Only when the still images instructed are not stored in the semiconductor memory 19, the still images are read out from the still image filing apparatus 2a, 2b and 2c. Whereas, when the still image instructed is stored in the semiconductor memory 19, still images are not read out from the fill image filing apparatus 2a, 2b and 2c and still images stored in the semiconductor memory 19 are transferred to the one frame memories $16a_1$, $16b_1$ and $16a_2$, $16b_2$ and to the semiconductor memory 19 at the divided (reserved) portions.

As a consequence, the useless access to the still image filing apparatus 2a, 2b and 2c is eliminated, which can increase the operation speed of the entirety of the apparatus more.

Still images transferred from the semiconductor memory 19 are not limited to those simultaneously stored in the remaining portion of the above semiconductor memory 19 and still images stored in the portions reserved by its own and other operation key apparatus $6_1$ and $6_2$ are to be retrieved. Also, when the same still image is read out to the same one frame memory 16 on the same substrate, the access to the still image filing apparatus 2a, 2b and 2c is inhibited.

Further, when the above-mentioned arrangement is realized, then the following countermeasures should be worked out in order to prevent wrong still images from being read out from the semiconductor memory 19:

(1) When the magnetooptical disks (MO disks) are ejected from the still image filing apparatus 2a, 2b and 2c, then still images of the frames having the same disk numbers on the semiconductor memories 19 are deleted;

(2) When the disks are formatted again, then still images of the frames having the same image numbers on the semiconductor memories 19 are deleted:

(3) When a still image on the disk is deleted, then a still image of the frame having the same still image number on the semiconductor memory 19 is deleted;

(4) When a still image number is varied, then still images of frames having a varied still image number and having a still image number to be varied on the semiconductor memory 19 are deleted; and (5) When a still image is varied, then a still image of the frame having the same still image number on the semiconductor memory 19 is deleted.

According to the above-mentioned countermeasures, it is possible to prevent wrong still images from being taken out from the semiconductor memory 19.

As described above, according to the present invention, when the access to the still image filing apparatus 2a, 2b and 2c is made, if it is determined by the retrieval of the stored contents in the semiconductor memory that the still image instructed is stored in the semiconductor memory 19, then this still image is read out from the semiconductor memory 19, which can reduce the number of the access to the still image filing apparatus 2a, 2b and 2c. Therefore, the advantage of this still image signal output apparatus can be increased particularly when a plurality of users utilize the operation key apparatus $6_1$ and $6_2$ simultaneously, and also the adaptability of the still image signal output apparatus to the production of television program or the like can be increased.

While there are provided two output substrates 15 in this apparatus, the number of the output substrate 15 can be set freely and six output substrates 15 are provided at maximum in the still image signal output apparatus according to this embodiment. Further, in the still image signal output apparatus according to the present invention, the value of N is 21, the value of M is 4 and therefore the value of NM is 84.

As described above, according to the present invention, when the access to the still image filing apparatus is made, if it is determined by the retrieval of the stored contents in the semiconductor memory that the still image instructed is stored in the semiconductor memory, then this still image is read out from the semiconductor memory, which can reduce the number of the access to the still image filing apparatus. Therefore, the advantage of this still image signal output apparatus can be increased particularly when a plurality of users utilize the operation key apparatus simultaneously, and also the adaptability of the still image signal output apparatus to the production of television program or the like can be increased Having described the preferred embodiment of the invention with reference to the accompanying drawings, it is to be understood that the invention is not limited to that precise embodiment and that various changes and modifications thereof could be effected by one skilled in the art without departing from the spirit or scope of the invention as defined in the appended claims.

What is claimed is:

1. Apparatus for transmitting still images retrieved from a still image filing apparatus, the transmitting apparatus comprising:
   transmission sequence memory means for storing a transmission sequence of still images,
   frame memory means for temporarily storing said still images;
   means for reading out the contents of the frame memory means and supplying the read out contents of the frame memory means as an output;
   semiconductor memory means for storing a plurality of those still images which are retrieved from the still image filing apparatus in accordance with the transmission sequence;
   processor means for controlling the semiconductor memory means to store the still images identified by the transmission sequence and for receiving the transmission sequence stored in the transmission sequence memory means; and
   transferring means responsive to the reading out of the contents of the frame memory means for transferring a still image from the semiconductor memory means to the frame memory means in accordance with the transmission sequence.

2. The apparatus according to claim 1, wherein said transmission sequence memory means includes means for storing a second transmission sequence of still images, the apparatus further comprising:
   second frame memory means for temporarily storing the still images; and
   means for reading out the contents of the second frame memory means and supplying the read out contents of the second frame memory means as an output; and
   wherein said transferring means is responsive to the reading out of the contents of the second frame memory means for transferring a still image from said semiconductor memory means to the second frame memory means in accordance with the second transmission sequence.

3. The apparatus according to claim 2, wherein said processor means controls the semiconductor memory means to store a plurality of still images retrieved from the still image filing apparatus identified by said second transmission sequence.

4. The apparatus according to claim 1, wherein said processor means is operative to inhibit the retrieval of a still image from the still image filing apparatus to said semiconductor memory means when the still image to be transferred to said frame memory means according to the transmission sequence is already stored in said semiconductor memory means.

5. The apparatus according to claim 1, wherein said frame memory means temporarily stores first and second still images and said means for reading out includes means for selecting the first still image stored in said frame memory means as a first output and for selecting the second still image stored in said frame memory means as a second output.

6. The apparatus according to claim 5, wherein said transferring means transfers said still image from said semiconductor memory means to said frame memory means to replace the still image of said frame memory means that had been previously selected.

7. Apparatus for transmitting still images retrieved from a still image filing apparatus, the transmitting apparatus comprising:

transmission sequence memory means for storing a transmission sequence of still images;

frame memory means for temporarily storing said still images;

means for reading out the contents of the frame memory means and supplying the read out contents of the frame memory means as an output;

semiconductor memory means for storing a plurality of those still images which are retrieved from the still image filing apparatus in accordance with the transmission sequence;

processor means for controlling the semiconductor memory means to store the still images identified by the transmission sequence and for receiving the transmission sequence stored in the transmission sequence memory means; and transferring means responsive to the reading out of the contents of the frame memory means for transferring a still image from the semiconductor memory means to the frame memory means in accordance with the transmission sequence, said processor means inhibiting the retrieval of a still image from the still image filing apparatus to said semiconductor memory means when the still image to be transferred to said frame memory means in accordance with the transmission sequence is already stored in said semiconductor memory means.

8. The apparatus according to claim 7, wherein said frame memory means temporarily stores first and second still images and said means for reading out includes means for selecting the first still image stored in said frame memory means as a first output and for selecting the second still image stored in said frame memory means as a second output, the apparatus further comprising first monitor receiver means for receiving said first output and displaying same and second monitor receiver means for receiving said second output and displaying same.

* * * * *